United States Patent [19]
Hara et al.

[11] Patent Number: 4,654,386
[45] Date of Patent: Mar. 31, 1987

[54] KETENE DIMER-ACRYLAMIDE POLYMER AQUEOUS DISPERSION

[75] Inventors: Tetsuya Hara; Toshiyuki Hakata, both of Ichihara; Keigo Goshiki, Chiba, all of Japan

[73] Assignee: Dic-Hercules Chemicals, Inc., Tokyo, Japan

[21] Appl. No.: 772,430

[22] Filed: Sep. 4, 1985

[51] Int. Cl.$^4$ ............................................. C08L 33/26
[52] U.S. Cl. ..................................... 524/107; 524/365; 524/555; 524/556
[58] Field of Search ................ 524/107, 365, 555, 556

[56] References Cited

U.S. PATENT DOCUMENTS 3,046,186  7/1962  Arlt ..................................... 524/107
4,296,012 10/1981  Okumichi et al. .................. 524/107

Primary Examiner—Harold D. Anderson
Attorney, Agent, or Firm—Oblon, Fisher, Spivak, McClelland & Maier

[57] ABSTRACT

A ketene dimer aqueous dispersion for paper sizing comprising a ketene dimer compound, an acrylamide type polymer having cationic groups and optionally an anionic dispersant and an aqueous medium is disclosed. This dispersion has a ketene dimer content as high as about 25–30% and good storage stability.

14 Claims, No Drawings

KETENE DIMER-ACRYLAMIDE POLYMER AQUEOUS DISPERSION

FIELD OF THE INVENTION

This invention relates to a ketene dimer aqueous dispersion having excellent storage stability at high concentrations, which is useful for sizing cellulose fibers.

BACKGROUND OF THE INVENTION

It is well known that ketene dimer compounds react and combine with hydroxy groups of cellulose fiber molecules to size cellulose fibers. Recently, they are particularly noted as a sizing agent for paper which can be used for paper-making in a neutral or slightly alkaline range without using alum.

Ketene dimer compounds have heretofore been being marketed and used in the form of an aqueous dispersion in which they are dispersed in an aqueous continuous phase containing starch, especially cationized starch. However, it is very difficult to obtain a stable aqueous dispersion of ketene dimers, since they are inherently highly reactive with water. A dispersion system will lose its homogeneity, for instance, forming scum or being gelled during storage. Further, the sizing efficiency and water-proofing property may deteriorate during storage. Especially, it is very difficult to obtain a stable high ketene dimer concentration aqueous dispersion thereof, and therefore the concentration of ketene dimers in conventional ketene dimer aqueous dispersions commercially available today is 15% at the highest. Such low concentration dispersion products are obviously disadvantageous in transportation and storage. Further, even such low concentration dispersions do not always have sufficient storage stability and therefore are not satisfactory for users.

The object of this invention is to provide a ketene dimer aqueous dispersion which has excellent storage stability at a concentration of not less than about 25% and is satisfactory in practical use. Of course, a ketene dimer aqueous dispersion of this invention effectively sizes cellulose fibers.

SUMMARY OF THE INVENTION

The above-mentioned object is achieved by a ketene dimer aqueous dispersion containing 100 parts of a ketene dimer compound which is represented by the general formula

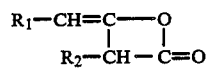  (I)

wherein $R_1$ and $R_2$ are respectively a hydrocarbyl group having 8–30 carbon atoms, 2–45 parts of an acrylamide type polymer of which 1–50 mole % of the constituent monomer units have cationic groups and 0–15 parts of an anionic dispersant in an aqueous medium.

The term acrylamide type polymer means polymer and copolymer mainly comprising acrylamide and/or methacrylamide. The term "(meth)acryl" used hereinafter means acryl and/or methacryl.

The cationic acrylamide type polymer used in the composition of the present invention does not only aids dispersion of ketene dimer compounds and acts as a protective colloid therefor but also assists ketene dimer compounds to be fixed on the surface of anionic cellulose fibers and to size them. That is, the cationic acrylamide type polymer in accordance with this invention promotes sizing effect of ketene dimer compounds.

The cationic acrylamide type polymer in accordance with this invention can be dispersed in water in a very high concentration and thus can form a ketene dimer aqueous dispersion of higher solids content. Thus ketene dimer aqueous dispersions of which the ketene dimer content is no less than 30% and the solids content is no less than 35% can be provided.

DETAILED DESCRIPTION OF THE INVENTION

Ketene dimer compounds are represented by the general formula (I).

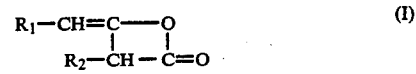  (I)

The ketene dimers which can be used in the present invention are those represented by the formula (I), wherein $R_1$ and $R_2$ are respectively a hydrocarbyl group having 8–30 carbon atoms. Examples of these hydrocarbyl groups are alkyl groups such as decyl, dodecyl, tetradecyl, hexadecyl, octadecyl, eicosyl, etc.; alkenyl groups such as tetradecenyl, hexadecenyl, octadecenyl, etc.; alkyl-substituted phenyl groups such as octylphenyl, nonylphenyl, etc.; alkyl-substituted cycloalkyl groups such as nonylcyclohexyl, etc.; aralkyl groups such as phenylethyl, etc. Alkyl groups are preferable. The ketene dimer compounds can be used solely or in combination.

The cationic acrylamide polymers used in the present invention are water-soluble or water-dispersible polymers which comprise main repeating units of acrylamide and/or methacrylamide group and 1–50 mole % of the monomer units thereof have cationic groups or 1–50 mole % of the monomer units thereof have cationic groups and that not more than 30 mole % of the monomer units have anionic groups. More specifically, the cationic groups may be primary, secondary or tertiary amino groups, or quaternary ammonium salt groups; and the cationic groups may be of the same kind or of two or more different kinds. The anionic groups may be carboxylic acid group, sulfonic acid group, sulfate ester group, phosphoric acid ester group, etc. and they may be of the same kind or of two or more different kinds. The acrylamide type polymer having cationic groups may contain other comonomer units up to the extent that does not impair dispersing performance. The molecular weight of the cationic acrylamide polymer is preferably in the range of 2,000–1,000,000. The polymer, the molecular weight of which is less than 2,000, is inferior in dispersing performance, and does not easily form a stable ketene dimer aqueous dispersion. The polymer the molecular weight of which is more than 1,000,000 has no problem in its dispersing performance but gives a ketene dimer aqueous dispersion having an extremely high viscosity, and thus it is difficult to obtain a high concentration dispersion, higher than 30% therewith.

The acrylamide type polymers having cationic groups used in the present invention can be prepared by means of various known processes. However, the following two processes in a broad classification will preferably be employed.

(Preparation 1)

Acrylamide and/or methacrylamide is copolymerized together with one of:
 (a) a monomer having cationic groups
 (b) a monomer having cationic groups and a monomer having anionic groups
 (c) a monomer having cationic groups and another comonomer
 (d) a monomer having cationic groups, a monomer having anionic groups and another comonomer (Preparation 2)

Cationic groups or cationic groups and anionic groups are introduced into a polymer or a copolymer of acrylamide and/or methacrylamide or a copolymer obtained by Preparation 1.

As the monomer having cationic groups, (mono- or dialkyl)amino(hydroxy)alkyl (meth)acrylate, mono-, or di-alkylaminoalkyl(meth)acrylamide, vinylpyridine, vinylimidazole, diallylamine, etc. can be used. (Parenthesized words are optional.) Also organic and inorganic acid salts thereof and quaternary ammonium salts thereof can be used.

As the monomer having anionic groups, monomers having a carboxyl groups or groups such as (meth)acrylic acid, maleic acid, fumaric acid, itaconic acid, citraconic acid, crotonic acid, etc.; monomers having a sulfonic acid group such as vinylsulfonic acid, (meth)allylsulfonic acid; sulfonated styrene, etc.; monomers having phosphoric acid groups such as phosphoric acid ester of hydroxyalkyl (meth)acrylate. As the comonomers, styrene and derivatives thereof; vinyl esters such as alkyl (meth)acrylate, (meth)acrylonitrile, vinyl acetate, vinyl propionate, etc.; methylvinylether, etc. can be copolymerized in an amount that the dispersing performance of the acrylamide type polymer having cationic groups is not impaired. Generally it is preferable that the comonomer is used in an amount of not more than 30 mole % in a copolymer.

Introduction of cationic groups into the acrylamide type polymers in the above-mentioned Preparation 2 can be economically effected by the so-called Hofmann reaction in which an acrylamide type polymer is reacted with hypochlorous acid in an alkaline range, or by the so-called Mannich reaction in which an acrylamide type polymer is reacted with formaldehyde and an amine.

Introduction of anionic groups into the acrylamide type polymer can be economically effected by the hydrolysis method in which the acrylamide type polymer is hydrolyzed by an acid or an alkali or the so-called sulfomethylation reaction in which the acrylamide type polymer is reacted with formaldehyde and sodium hydrogen sulfite or the anhydride thereof.

The anionic dispersant used in the present invention is as follows. Anionic dispersants encompasses those having carboxylic groups, those having sulfonic acid groups, those having sulfate ester groups, those having phosphoric acid ester groups, etc. Of these, anionic dispersants having at least one of sulfonic acid group, and sulfate acid ester group are preferred. Specifically, dialkyl sulfosuccinate, (hydroxy)alkanesulfonic acid salt, alkylbenzenesulfonic acid salt, alkylnaphthalenesulfonic acid salt, alkylphenoxypolyoxyethylenepropyl-sulfonic acid salt, polyoxyethylenealkyl-sulfophenylether salt, N-methyl-N-oleyltaurine sodium salt, N-alkylsulfosuccinic acid monoamido-2-sodium salt, petroleum sulfonic acid salt, lignosulfonic acid salt, (alkyl)naphthalenesulfonic acid salt-formaldehyde condensate, sulfate ester salt of alkyl ester of aliphatic acid, alkyl sulfate ester salt, polyoxyethylenealkylphenylether sulfate ester salt, aliphatic acid monoglyceride sulfate ester salt, polyoxyethylenealkylphenylether sulfate ester salt, polyoxyethylenestyrylphenylether sulfate ester salt, etc. can be suitably used.

Now the proportion of the ketene dimer compound, the acrylamide type polymer having cationic groups and the anionic dispersant in the composition of this invention will be explained. In order to achieve the above-mentioned object of this invention, it is suitable that the ratio of the ketene dimer compound to the acrylamide type polymer having cationic groups is 100:2–100:45 and when any anionic dispersant is used, it is used in an amount of 0.03–15 parts by weight per 100 parts of the ketene dimer compound.

The acrylamide type polymer having cationic groups in an amount of less than 2 parts by weight per 100 parts of the ketene dimer compound is not sufficient to form a high concentration ketene dimer aqueous dispersion having excellent storage stability. The acrylamide type polymer having cationic groups in an amount of more than 45 parts by weight per 100 parts by weight of the ketene dimer compound is not merely unnecessarily excessive to form a high concentration ketene dimer aqueous dispersion having excellent storage stability but degradates the sizing performance of the composition. The preferred content range of the cationic acrylamide type polymer is 5–30 parts per 100 parts of ketene dimer compound. The more preferred range is 10–25 parts per 100 parts ketene dimer compound.

When an anionic dispersant is used, an anionic dispersant in an amount less than 0.03 part by weight per 100 parts of a ketene dimer compound does not bring about any improved effect in sizing performance, for cellulose fibers nor any improved storage stability in comparison with a ketene dimer aqueous dispersion in which a ketene dimer compound is dispersed in an aqueous continuous phase containing only an acrylamide type polymer having cationic groups without any anionic dispersant. An anionic dispersant in an amount in excess of 15 parts by weight per 100 parts by weight of a ketene dimer compound will not only deteriorate the storage stability of the resulting dispersion but also deteriorate sizing performance, waterproofing effect for cellulose fibers. In the composition of this invention, any cationic dispersant such as cationic starch, etc. and any nonionic dispersant, which are used in conventional ketene dimer aqueous dispersion can optionally be used without any adverse effect. If it is used in an amount such that storage stability and sizing performance for cellulose fibers are not impaired.

The ketene dimer aqueous dispersion of this invention can be prepared by various known conventional methods. For instance, the dispersion can be prepared by mixing a ketene dimer compound, an acrylamide type polymer having cationic groups and an anionic dispersant if used, in an aqueous medium at a temperature higher than the melting point of the ketene dimer compound and homogeneously dispersing the mixture by means of a homomixer, a high pressure homogenizer, an ultrasonic emulsifier, etc. Or, the dispersion can be prepared by dissolving a ketene dimer compound in a water-insoluble organic solvent such as toluene, dichloroethane, etc., dissolving an acrylamide type polymer having cationic groups and an anionic dispersant, if used, in an aqueous medium, homogeneously dispersing the two phases by means of a homomixer, a high pressure homogenizer, an ultrasonic emulsifier, etc., and finally removing the water-insoluble organic solvent by distilling under a reduced pressure. The particle size of the dispersed phase in the resulting ketene dimer aqueous dispersion should preferably be not larger than 10 microns, more preferably not larger than 3 microns. As the particle size increases, the dispersion becomes liable to lose its homogeneity. Especially, when the particle size is larger than 10 microns, it is difficult to obtain a high concentration ketene dimer aqueous dispersion having good storage stability.

EMBODIMENTS OF THE INVENTION

The invention will now be illustrated by way of working examples. However, the invention is not limited to these examples only, but modifications can be made within the claimed scope of the invention. In the following examples, parts and percentages are by weight if not specifically defined otherwise.

Abbreviations used mean as follows;
AAm: acrylamide
DM: dimethylaminoethyl methacrylate
DMC: methacryloyloxyaminoethyltrimethylammonium chloride
Q: 2-hydroxy-3-methacryloyloxypropyltrimethylammonium chloride
AA: acrylic acid
MA: maleic acid
IA: itaconic acid (PREPARATION OF ACRYLAMIDE POLYMERS HAVING CATIONIC GROUPS)

REFERENCE EXAMPLE 1

In a 1,000 ml four-necked flask equipped with a stirrer, a thermometer, a refluxing condenser and a nitrogen gas inlet, 49.5 g of dimethylaminoethyl methacrylate, 253.8 g of a 50% acrylamide aqueous solution, 8.1 g of isopropyl alcohol and 600 g of water were placed. The pH of the mixture was adjusted to 4–4.5 with a 15% sulfuric acid aqueous solution, and the oxygen in the reaction system was purged by nitrogen gas.

As the polymerization initiator, 9.6 g of a 5% ammonium persulfate aqueous solution, sodium hydrogen sulfite aqueous solution were added to the mixture under agitation, and the reaction system was warmed to 75° C. over 30 minutes, and was held at said temperature for 3 hours. The resulting copolymer aqueous solution contained 20.4% of solid ingredients and exhibited a pH of 4.2 and a Brookfield viscosity (hereinafter simply referred to as viscosity) of 3,000 cps at 25° C., from which the molecular weight of the formed copolymer was estimated to be about 150,000. The amount of the ionic groups of the copolymer was determined by the colloid titration, and was found that 15 mole % of cationic groups (tertiary amino groups) were introduced.

REFERENCE EXAMPLES 2-3 AND COMPARATIVE REFERENCE EXAMPLES 1-2

The procedure of Reference Example 1 was repeated using the starting materials indicated in Table 1 except that the amounts of the isopropyl alcohol for adjustment of molecular weight, and the 15% sulfuric acid aqueous solution for adjustment of pH were varied suitably in each case. The properties of the resulting copolymers are given in Table 1.

The term Reference Example means an example in which the polyacrylamide type polymer to be used for the composition of this invention is prepared. The term Comparative Reference Example means an example in which acrylamide type polymers contain cationic groups in an amount outside of the claimed range.

TABLE 1

|  | Constituent Monomers (mole %) | | Properties of Polymers | | |
|---|---|---|---|---|---|
|  | DM | AAm | Solid Cont. (%) | Viscosity (cps/ 25° C.) | Cationic Group (mole %)* |
| Ref. Ex. 1 | 15 | 85 | 20.4 | 3,000 | 15 |
| Ref. Ex. 2 | 2 | 98 | 20.5 | 3,500 | 2 |
| Ref. Ex. 3 | 45 | 55 | 20.2 | 2,600 | 46 |
| Comp. Ref. Ex. 1 | 80 | 20 | 20.0 | 2,400 | 82 |
| Comp. Ref. Ex. 2 | 0 | 100 | 20.5 | 4,000 | 0 |

*Mole percent of the monomer units having cationic groups in the total monomer units constituting a polymer

REFERENCE EXAMPLES 4-9 AND COMPARATIVE REFERENCE EXAMPLE 3

The procedure of Reference Example 1 was repeated except that monomers indicated in Table 2 were used, and aqueous solutions (pH 4.0±0.5) of cationic and amphoteric copolymers were obtained. Properties of the thus obtained copolymer solutions are given in Table 2.

TABLE 2

|  | Proportion of Monomers (mole %) | | | | | | | Properties of Polymers | | | |
|---|---|---|---|---|---|---|---|---|---|---|---|
|  | DM | DMC | Q | AA | MA | IA | AAm | Solid Cont. (%) | Viscosity at 25° C. (cps) | Cationic Group (mole %)* | Anionic Group (mole %)* |
| Ref. Ex. 4 |  | 15 |  |  |  |  | 85 | 20.3 | 3,300 | 15 | 0 |
| Ref. Ex. 5 |  |  | 15 |  |  |  | 85 | 20.2 | 3,200 | 15 | 0 |
| Ref. Ex. 6 | 7.5 | 7.5 |  |  |  |  | 85 | 20.2 | 3,500 | 15 | 0 |
| Ref. Ex. 7 | 15 |  |  | 10 |  |  | 75 | 20.3 | 3,700 | 14 | 9 |
| Ref. Ex. 8 | 15 |  |  |  | 10 |  | 75 | 20.0 | 3,200 | 14 | 6 |
| Ref. Ex. 9 | 15 |  |  |  |  | 10 | 75 | 20.4 | 3,400 | 14 | 7 |
| Comp. Ref. Ex. 3 | 15 |  |  | 40 |  |  | 45 | 20.0 | 4,000 | 13 | 37 |

*Mole percentage of monomer units having cationic groups or cationic groups and anionic groups in the total monomer units constituting copolymers

REFERENCE EXAMPLE 10

In a 300 ml three-necked flask equipped with a stirrer, a thermometer, and a 100 ml dropping funnel, 142.2 g of a 15% polyacrylamide aqueous solution (3,000 cps at 25° C., estimated molecular weight 200,000) was placed, and a mixture of 50.7 g of sodium hypochlorite of which the available chlorine content was 12% and 6.5 g of a 50% sodium hydroxide aqueous solution was added dropwise under agitation and cooling. Thereafter the temperature of the system was kept at 20° C. and further 22.8 g of a 50% choline chloride aqueous solution was added.

After the mixed solution was kept at 20° C. for 2 hours under agitation, the residual chlorine was determined, and a 20% sodium thiosulfate aqueous solution of the amount equivalent to said residual chlorine was added.

Thereafter, the pH of the mixture was adjusted to 4.5 with 15% hydrochloric acid, and a solution of the Hofmann reaction product, the polymer content of which was 10% was obtained. A colloid titration revealed that 19 mole % of cationic groups (primary amino groups and quaternary ammonium salt groups) were introduced in the resulting copolymer.

REFERENCE EXAMPLE 11

In a 1,000 ml three-necked flask, equipped with a stirrer, a thermometer and a refluxing condenser, 600 g of a 15% polyacrylamide aqueous solution having a viscosity of 3,000 cps at 25° C. and an estimated molecular weight of 200,000 was placed and warmed to 40° C. Then 34.2 g of a 50% dimethylamine aqueous solution and 24.6 g of a 37% formaldehyde aqueous solution were added thereto and the pH of the solution was adjusted to 10 with a 30% sodium hydroxide aqueous solution and the solution was kept at 40° C. for 2 hours. Thus a solution of the Mannich reaction product, of which the solid content was 15.2%, the pH was 10.2 and the viscosity was 3,500 cps at 25° C., was obtained. A colloid titration revealed that 21 mole % of cationic groups (tertiary amino groups) were introduced in the resulting copolymer.

(PREPARATION OF KETENE DIMER AQUEOUS DISPERSION AND STABILITY AND SIZING EFFECT THEREOF)

EXAMPLE 1

One hundred (100) parts of water and 100 parts of the polymer obtained in Reference Example 1 were mixed and the pH of the mixture was adjusted to 3.5 with a 15% sulfuric acid aqueous solution. After the solution was warmed to 70° C., 100 parts of commercially available hexadecylketene dimer was added thereto and the mixture was preliminarily emulsified by agitation. The obtained preliminarily emulsified mixture was passed through a homogenizer once at a pressure of 4,000 psi. The thus obtained homogenized ketene dimer dispersion was diluted with water so that the solid content thereof was 30%.

EXAMPLES 2–14 AND COMPARATIVE EXAMPLES 1–6

The procedure of Example 1 was repeated except that materials and conditions indicated in Table 3 were employed.

The results of the stability test and sizing test of these Examples and Comparative Examples are also shown in Table 3.

The stability was evaluated by observing the state of ketene dimer aqueous dispersions after prepared ketene dimer aqueous dispersions were allowed to stand for one month. Rankings were as follows:

: Little or no change in viscosity, no agglomeration of particles observed

: Little or no change in viscosity, slight agglomeration of particles observed

Δ: Slight increase in viscosity, but usable

×: Remarkable increase in viscosity, not usable

××: Gelled within a few days after emulsification

The sizing test was carried out under the following conditions:

Pulp employed: Hardwood BKP (Canadian Standard Freeness 380 ml)

Amount of sizing agent: Ketene dimer aqueous dispersion was added in a proportion that the amount of the solid ingredients in the used ketene dimer dispersion is 0.1% of the completely dry weight of the used pulp Retention aid: Kymene 557H (manufactured by DIC-Hercules Chemicals Inc.) was added in a proportion that the amount of the solid ingredients thereof is 0.05% of the completely dry weight of the used pulp Running pH: 8.0

Paper Machine: Hand-sheet machine manufactured by Noble & Wood, Inc.

Drying: 100° C., 40 sec. in a drum dryer

Basis weight: 65 g/m$^2$

Sizing test: Stöckigt method (JIS P-8122)

TABLE 3

|  | Polymer Used | Amount of Polymer[*1] | Solids Content (%) | Ketene Dimer Conc. (%) | Stability Test | Stöckigt Sizing Degree (sec) |
|---|---|---|---|---|---|---|
| Ex. 1 | Ref. Ex. 1 | 20 | 30 | 25 |  | 36 |
| Ex. 2 | Ref. Ex. 1 | 10 | 30 | 27 | Δ | 45 |
| Ex. 3 | Ref. Ex. 1 | 40 | 30 | 21 |  | 30 |
| Comp. Ex. 1 | Ref. Ex. 1 | 1 | 30 | 30 | ×× | — |
| Comp. Ex. 2 | Ref. Ex. 1 | 50 | 30 | 20 |  | 18 |
| Ex. 4 | Ref. Ex. 2 | 20 | 30 | 25 | Δ | 32 |
| Ex. 5 | Ref. Ex. 3 | 20 | 30 | 25 | Δ | 33 |
| Ex. 6 | Ref. Ex. 4 | 20 | 30 | 25 |  | 36 |
| Ex. 7 | Ref. Ex. 5 | 20 | 30 | 25 |  | 34 |
| Ex. 8 | Ref. Ex. 6 | 20 | 30 | 25 |  | 37 |
| Ex. 9 | Ref. Ex. 7 | 20 | 30 | 25 |  | 31 |
| Ex. 10 | Ref. Ex. 8 | 20 | 30 | 25 |  | 32 |
| Ex. 11 | Ref. Ex. 9 | 20 | 30 | 25 |  | 35 |
| Ex. 12 | Ref. Ex. 10 | 20 | 30 | 25 |  | 35 |
| Ex. 13 | Ref. Ex. 11 | 20 | 30 | 25 |  | 32 |
| Ex. 14 | Comp. Ref. Ex. 1 | 20 | 35 | 29 | Δ | 36 |
| Comp. Ex. 3 | Comp. Ref. Ex. 1 | 20 | 30 | 25 | × | — |
| Comp. Ex. 4 | Comp. Ref. Ex. 2 | 20 | 30 | 25 | ×× | — |
| Comp. Ex. 5 | Comp. Ref. Ex. 3 | 20 | 30 | 25 | × | — |
| A Commercial Available |  |  | 20 | 15 | Δ | 30 |

TABLE 3-continued

|  | Polymer Used | Amount of Polymer*1 | Solids Content (%) | Ketene Dimer Conc. (%) | Stability Test | Stockigt Sizing Degree (sec) |
|---|---|---|---|---|---|---|
| Product |  |  |  |  |  |  |

*1 Parts by weight of solid content of polymer per 100 parts by weight of ketene dimer

EXAMPLE 15

An aqueous dispersion of commercially available hexadecylketene dimer was prepared as follows.

Fifty (50) parts of water, 100 parts of the polymer obtained in Reference Example 1 and 20 parts of sodium lignosulfonate were mixed. The pH of this mixture was adjusted to 3.5 with a 15% sulfuric acid aqueous solution and the mixture was warmed to 70° C. Thereafter, 100 parts of hexadecylketene dimer was added to the mixture, and the mixture was preliminarily emulsified by agitation. The resulting preliminarily emulsified mixture was passed through a homogenizer once at a pressure of 4,000 psi. The resulting dispersion was diluted with water so that the solids content thereof was 35%.

EXAMPLES 16-27 AND COMPARATIVE EXAMPLES 6-11

The procedure of Example 15 was repeated except that materials and conditions indicated in Table 4 were employed. The test results of the obtained dispersions are also indicated in Table 4.

TABLE 4

|  | Polymer Used | Amount of Polymer*1 | Anionic Dispersant*2 | Amount of Dispersant*1 | Solids Content (%) | Ketene Dimer Conc. (%) | Stability Test | Stockigt Sizing Degree (sec) |
|---|---|---|---|---|---|---|---|---|
| Ex. |  |  |  |  |  |  |  |  |
| 15 | Ref. Ex. 1 | 20 | SLS | 4.0 | 35 | 28 |  | 35 |
| 16 | Ref. Ex. 1 | 20 | SLS | 1.0 | 35 | 29 |  | 33 |
| 17 | Ref. Ex. 1 | 20 | SNS | 2.0 | 35 | 29 |  | 35 |
| 18 | Ref. Ex. 1 | 20 | SNS | 0.5 | 35 | 29 |  | 34 |
| 19 | Ref. Ex. 1 | 40 | SLS | 4.0 | 35 | 24 |  | 30 |
| 20 | Ref. Ex. 1 | 10 | SLS | 4.0 | 35 | 31 |  | 45 |
| 21 | Ref. Ex. 2 | 20 | SLS | 4.0 | 35 | 28 |  | 33 |
| 22 | Ref. Ex. 3 | 20 | SLS | 4.0 | 35 | 28 |  | 33 |
| 23 | Ref. Ex. 4 | 20 | SLS | 4.0 | 35 | 28 |  | 32 |
| 24 | Ref. Ex. 5 | 20 | SLS | 4.0 | 35 | 28 |  | 37 |
| 25 | Ref. Ex. 6 | 20 | SLS | 4.0 | 35 | 28 |  | 31 |
| 26 | Ref. Ex. 7 | 20 | SLS | 4.0 | 35 | 28 |  | 36 |
| 27 | Ref. Ex. 8 | 20 | SLS | 4.0 | 35 | 28 |  | 32 |
| Comp. Ex. |  |  |  |  |  |  |  |  |
| 6 | Ref. Ex. 1 | 20 | SLS | 20.0 | 35 | 25 | xx | — |
| 7 | Ref. Ex. 1 | 50 | SLS | 4.0 | 35 | 22 |  | 15 |
| 8 | Ref. Ex. 1 | 1 | SLS | 4.0 | 35 | 33 | xx | — |
| 9 | Comp. Ref. Ex. 1 | 20 | SLS | 4.0 | 35 | 28 | x | — |
| 10 | Comp. Ref. Ex. 2 | 20 | SLS | 4.0 | 35 | 28 | xx | — |
| 11 | Comp. Ref. Ex. 3 | 20 | SLS | 4.0 | 35 | 28 | x | — |
| A Commercial Available Product | — | — | — | — | 20 | 15 | Δ | 30 |

*1 Parts by weight of polymer or dispersant per 100 parts by weight of ketene dimer
*2 SLS: sodium lignosulfonate
SNS: sodium naphthalenesulfonate-formaldehyde condensate

We claim:

1. A ketene dimer aqueous dispersion containing 100 parts of a ketene dimer compound which is represented by the general formula

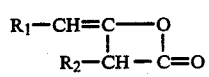

(I)

wherein $R_1$ and $R_2$ are respectively a hydrocarbyl group having 8–30 carbon atoms, 2–45 parts of an acrylamide polymer of which 1–50 mole % of the monomer units constituting said polymer have cationic groups and 0.03–15 parts of an anionic dispersant having at least one sulfonic acid or sulfate ester group, in an aqueous medium.

2. The ketene dimer aqueous dispersion claimed in claim 1, wherein up to 30 mole % of the monomer units constituting said polymer further have anionic groups.

3. The ketene dimer aqueous dispersion claimed in claim 2, wherein the acrylamide copolymer has 0.5–20 mole % of constituent units having anionic groups.

4. The ketene dimer aqueous dispersion claimed in claim 2, wherein the acrylamide polymer is a copolymer of a monomer having cationic groups, and acrylamide or methacrylamide.

5. The ketene dimer aqueous dispersion claimed in claim 4, wherein the acrylamide polymer is a copolymer of a monomer having cationic groups, a monomer having anionic groups and acrylamide or methacrylamide.

6. The ketene dimer aqueous dispersion claimed in claim 1, 2 or 3, wherein the acrylamide polymer is a product of the Hofmann reaction.

7. The ketene dimer aqueous dispersion claimed in claim 1, 2 or 3, wherein the acrylamide polymer is a product of the Mannich reaction.

8. The ketene dimer aqueous dispersion claimed in claim 1, which contains 5–30 parts of the acrylamide polymer having cationic groups per 100 parts of the ketene dimer compound.

9. The ketene dimer aqueous dispersion claimed in claim 8, which contains 10–25 parts of the acrylamide polymer having cationic groups per 100 parts of the ketene dimer compound.

10. The ketene dimer aqueous dispersion claimed in claim 1, which contains 0.03–10 parts of an anionic dispersant per 100 parts of the ketene dimer compound.

11. The ketene dimer aqueous dispersion claimed in claim 10, wherein the anionic dispersant is an anionic dispersant having sulfonic acid groups or sulfate ester groups.

12. The ketene dimer aqueous dispersion claimed in claim 1, wherein the ketene dimer is a compound represented by the formula (I), wherein $R_1$ and $R_2$ are respectively an alkyl group.

13. The ketene dimer aqueous dispersion claimed in claim 12, wherein the ketene dimer is a compound represented by the formula (I), wherein $R_1$ and $R_2$ are respectively an alkyl having 12–24 carbon atoms.

14. The ketene dimer aqueous dispersion claimed in claim 1, wherein the anionic dispersant is a substance selected from the group consisting of dialkyl sulfosuccinate, (hydroxy)alkanesulfonic acid salt, alkylbenzenesulfonic acid salt, alkylnaphthalenesulfonic acid salt, alkylphenoxypolyoxyethylenepropylsulfonic acid salt, polyoxyethylenealkylenealkylsulfophenylether salt, N-methyl-N-oleyltaurine sodium salt, N-alkylsulfosuccinic acid monoamido-2-sodium salt, petroleum sulfonic acid salt, lignosulfonic acid salt, (alkyl)naphthalenesulfonic acid salt-formaldehyde condensate, sulfate ester salt of alkyl ester of aliphatic acid, alkyl sulfate ester salt, polyoxyethylenealkylphenylether sulfate ester salt, aliphatic acid monoglyceride sulfate ester salt, polyoxyethylenealkylphenylether sulfate ester salt and polyoxyethylenestyrylphenylether sulfate ester salt.

* * * * *